(12) United States Patent
Klappert et al.

(10) Patent No.: US 8,650,607 B2
(45) Date of Patent: Feb. 11, 2014

(54) METHOD AND SYSTEM FOR PROVIDING INTERACTIVE LOOK-AND-FEEL IN A DIGITAL BROADCAST VIA AN X-Y PROTOCOL

(75) Inventors: Walter R. Klappert, Topanga, CA (US); William J. Sequeira, Los Angeles, CA (US)

(73) Assignee: Banbury Technologies LLC, Wilmington, DE (US)

( * ) Notice: Subject to any disclaimer, the term of this patent is extended or adjusted under 35 U.S.C. 154(b) by 251 days.

(21) Appl. No.: 12/861,594

(22) Filed: Aug. 23, 2010

(65) Prior Publication Data

US 2011/0055885 A1   Mar. 3, 2011

Related U.S. Application Data

(63) Continuation of application No. 09/866,523, filed on May 25, 2001, now Pat. No. 7,805,747, which is a continuation of application No. 08/774,055, filed on Dec. 23, 1996, now Pat. No. 6,256,785.

(51) Int. Cl.
*H04N 7/173* (2011.01)
*H04N 5/445* (2011.01)

(52) U.S. Cl.
USPC ........... 725/113; 725/109; 725/112; 715/203; 715/205

(58) Field of Classification Search
USPC ............. 725/112, 113, 109, 110, 136, 43, 51; 715/201, 203, 205; 348/564
See application file for complete search history.

(56) References Cited

U.S. PATENT DOCUMENTS

| 3,991,266 A | 11/1976 | Baer |
| 4,381,522 A | 4/1983 | Lambert |
| 4,694,490 A | 9/1987 | Harvey et al. |
| 4,706,121 A | 11/1987 | Young |
| 4,974,178 A | 11/1990 | Izeki et al. |

(Continued)

FOREIGN PATENT DOCUMENTS

| EP | 0711076 A2 | 5/1996 |
| EP | 0711076 A2 | 5/1996 |

(Continued)

OTHER PUBLICATIONS (Mourad, Object Representation for Multimedia Document Interchange 1991, IEEE).*

(Continued)

*Primary Examiner* — Pankaj Kumar
*Assistant Examiner* — Reuben M Brown (57) ABSTRACT

A system for providing an interactive look-and-feel in a digital video broadcast via an X-Y protocol is provided. At a head-end, video information is digitized and associated with private data, such as event identifications, X-Y coordinates, link event identification and synchronization data. This information is then transmitted to a receiving end and is input into a set-top box. The set-top box receives the broadcast digital signal and includes a member for receiving the broadcast digital signal and generating a playable signal including indicia of the link data. The playable signal is then played on a playing device. The user is provided with a remote control or similar input device for selecting from the indicia. Upon selection of a desired indicia, the user may exercise the predetermined link associated with the selected indicia in order to obtain the desired playable signal.

20 Claims, 8 Drawing Sheets

(56) References Cited

U.S. PATENT DOCUMENTS

| | | |
|---|---|---|
| 5,001,554 A | 3/1991 | Johnson et al. |
| 5,038,211 A | 8/1991 | Hallenbeck |
| 5,168,353 A | 12/1992 | Walker et al. |
| 5,196,838 A | 3/1993 | Meier et al. |
| 5,212,553 A | 5/1993 | Maruoka |
| 5,220,657 A | 6/1993 | Bly et al. |
| 5,223,924 A | 6/1993 | Strubbe |
| 5,251,324 A | 10/1993 | Mcmullan, Jr. |
| 5,262,865 A | 11/1993 | Herz |
| 5,317,306 A | 5/1994 | Abraham et al. |
| 5,323,240 A | 6/1994 | Amano et al. |
| 5,341,293 A | 8/1994 | Vertelney et al. |
| 5,343,250 A | 8/1994 | Iwamura |
| 5,351,075 A | 9/1994 | Herz et al. |
| 5,353,121 A | 10/1994 | Young et al. |
| 5,355,450 A | 10/1994 | Garmon et al. |
| 5,371,846 A | 12/1994 | Bates |
| 5,373,315 A | 12/1994 | Dufresne et al. |
| 5,375,068 A | 12/1994 | Palmer et al. |
| 5,384,909 A | 1/1995 | Brown |
| 5,388,197 A | 2/1995 | Rayner |
| 5,394,521 A | 2/1995 | Henderson et al. |
| 5,404,393 A | 4/1995 | Remillard |
| 5,410,344 A | 4/1995 | Graves et al. |
| 5,414,471 A | 5/1995 | Saitoh et al. |
| 5,416,508 A | 5/1995 | Sakuma et al. |
| 5,420,975 A | 5/1995 | Blades et al. |
| 5,423,555 A | 6/1995 | Kidrin |
| 5,448,315 A | 9/1995 | Soohoo |
| 5,452,012 A | 9/1995 | Saitoh |
| 5,455,626 A | 10/1995 | Xu et al. |
| 5,479,266 A | 12/1995 | Young et al. |
| 5,479,268 A | 12/1995 | Young et al. |
| 5,481,296 A | 1/1996 | Cragun et al. |
| 5,481,297 A | 1/1996 | Cash et al. |
| 5,517,257 A | 5/1996 | Dunn et al. |
| 5,523,791 A | 6/1996 | Berman |
| 5,524,195 A | 6/1996 | Clanton et al. |
| 5,532,754 A | 7/1996 | Young et al. |
| 5,537,153 A | 7/1996 | Shigihara |
| 5,541,662 A * | 7/1996 | Adams et al. ................ 348/460 |
| 5,548,532 A | 8/1996 | Menand et al. |
| 5,550,576 A | 8/1996 | Klosterman |
| 5,561,457 A | 10/1996 | Cragun et al. |
| 5,565,909 A | 10/1996 | Thibadeau et al. |
| 5,585,858 A | 12/1996 | Harper et al. |
| 5,589,892 A | 12/1996 | Knee et al. |
| 5,614,940 A | 3/1997 | Cobbley et al. |
| 5,619,250 A | 4/1997 | Mcclellan et al. |
| 5,619,274 A | 4/1997 | Roop et al. |
| 5,623,589 A | 4/1997 | Needham et al. |
| 5,624,265 A | 4/1997 | Redford et al. |
| 5,627,936 A | 5/1997 | Prasad et al. |
| 5,629,733 A | 5/1997 | Youman et al. |
| 5,633,683 A | 5/1997 | Rosengren et al. |
| 5,635,978 A | 6/1997 | Alten et al. |
| 5,635,979 A | 6/1997 | Kostreski et al. |
| 5,666,293 A | 9/1997 | Metz et al. |
| 5,666,645 A | 9/1997 | Thomas et al. |
| 5,682,206 A | 10/1997 | Wehmeyer et al. |
| 5,684,918 A | 11/1997 | Abecassis |
| 5,694,163 A | 12/1997 | Harrison |
| 5,694,334 A | 12/1997 | Donahue et al. |
| 5,699,106 A | 12/1997 | Matsubara et al. |
| 5,701,451 A | 12/1997 | Rogers et al. |
| 5,708,845 A | 1/1998 | Wistendahl et al. |
| 5,717,914 A | 2/1998 | Husick et al. |
| 5,727,141 A | 3/1998 | Hoddie et al. |
| 5,734,720 A | 3/1998 | Salganicoff |
| 5,737,552 A | 4/1998 | Lavallee et al. |
| 5,742,816 A | 4/1998 | Barr et al. |
| 5,745,754 A | 4/1998 | Lagarde et al. |
| 5,745,909 A | 4/1998 | Perlman et al. |
| 5,748,255 A | 5/1998 | Johnson et al. |
| 5,751,280 A | 5/1998 | Abbott et al. |
| 5,751,282 A | 5/1998 | Girard et al. |
| 5,768,539 A | 6/1998 | Metz et al. |
| 5,790,806 A | 8/1998 | Koperda |
| 5,815,145 A | 9/1998 | Matthews, III |
| 5,818,438 A | 10/1998 | Howe et al. |
| 5,818,441 A | 10/1998 | Throckmorton et al. |
| 5,822,014 A | 10/1998 | Steyer et al. |
| 5,826,166 A | 10/1998 | Brooks et al. |
| 5,859,662 A | 1/1999 | Cragun et al. |
| 5,860,071 A | 1/1999 | Ball et al. |
| 5,918,039 A * | 6/1999 | Buswell et al. ................ 703/27 |
| 5,929,849 A | 7/1999 | Kikinis |
| 5,931,908 A | 8/1999 | Gerba et al. |
| 6,006,256 A | 12/1999 | Zdepski et al. |
| 6,018,764 A | 1/2000 | Field et al. |
| 6,182,090 B1 * | 1/2001 | Peairs ........................ 715/209 |
| 7,805,747 B2 * | 9/2010 | Klappert et al. ............. 725/112 |
| 2008/0276283 A1 * | 11/2008 | Boyer et al. .................. 725/51 |

FOREIGN PATENT DOCUMENTS

| | | |
|---|---|---|
| EP | 0746153 A1 | 12/1996 |
| EP | 0746153 A1 | 12/1996 |
| JP | 05-064167 A | 3/1993 |
| WO | 9515646 A | 6/1995 |
| WO | 9531069 A | 11/1995 |
| WO | 9613124 A | 5/1996 |
| WO | 9638002 A | 11/1996 |
| WO | PCTUS9638002 | 11/1996 |
| WO | 9641472 A | 12/1996 |
| WO | 9704595 A | 2/1997 |
| WO | 9828907 A | 7/1998 |
| WO | WO9828907 | 7/1998 |

OTHER PUBLICATIONS

Didier Le Gall; MPEG Communication Standard Multimedia Communications; Association of Computing Machinery, vol. 34, No. 4, Apr. 1991.

Mourad; Object Representation for Multimedia Document Interchange; Mar. 1991; IEEE, ICC 1991; 18.5.1-18.5.7.

PCT International Search Report for Application No. PCT/US97/23984, dated Jul. 28, 1998.

* cited by examiner

```
SWITCHING SCHEDULE
       :
       :
TIME = 11:28:00:00
VIDEO SWITCH C
X1=40, Y1=60, X2=300, Y2=220
LINK EVENT = #27
VIDEO SWITCH E
X1=340, Y1=60, X2=500, Y2=220
LINK EVENT = #29
VIDEO SWITCH H
X1=40, Y1=260, X2=300, Y2=420
LINK EVENT = #47
VIDEO SWITCH K
X1=340, Y1-260, X2=500, Y2=420
LINK EVENT= #42

TIME = 11:30:00:00
VIDEO SWITCH D
X1=40, Y1=60, X2=300, Y2=220
LINK EVENT = #28
VIDEO SWITCH F
X1=340, Y1=60, X2=500, Y2=220
LINK EVENT= #30
VIDEO SWITCH I
X1=40, Y1=260, X2=300, Y2=420
LINK EVENT= #48
VIDEO SWITCH L
X1=340, Y1=260, =X2=500, Y2=420
LINK EVENT= #43
```

METHOD AND SYSTEM FOR PROVIDING INTERACTIVE LOOK-AND-FEEL IN A DIGITAL BROADCAST VIA AN X-Y PROTOCOL

CROSS REFERENCE TO RELATED APPLICATION

This is a continuation of U.S. patent application Ser. No. 09/866,523, filed May 25, 2001, (now U.S. Pat. No. 7,805,747 issued Sep. 28, 2010), which is a continuation of U.S. patent application Ser. No. 08/774,055, filed Dec. 26, 1996, (now U.S. Pat. No. 6,256,785 issued Jul. 3, 2001) both of which are herein incorporated by reference and continued preservation of which is requested.

This invention is directed to a digital video broadcast system and method, and, in particular to a system and method of providing interactive look-and-feel in a digital video broadcast system via an X-Y protocol which transmits from a head end server to a set-top box.

Fully interactive television based on sessions between a server at a head-end and a client set-top box has proven to be very expensive and impractical for commercial applications at this time. However, less expensive one-way broadcast systems using satellites or microwaves are now being deployed which use digital video compression to provide an increased number of video Channels to a viewer. It is desirable to create a system that distributes digital video along with other data. Such other data can include a protocol which is usable to create a system that results in a look-and-feel of interactivity without transmission from the client set-top box to the head end server.

U.S. Pat. No. 3,991,266 (Baer) issued Sep. 9, 1976 and is directed to dual image television. In particular, this patent is directed to an early method for transmitting a sequence of horizontal video lines taken alternatively from two video sources, so that in one transmission when playing alternate horizontal video lines, either one of the video tracks may be played.

Additionally, U.S. Pat. No. 5,414,471 (Saitoh, et al.) issued May 9, 1995 and is directed to a moveable cursor for selecting and exchanging a main picture and subpictures in a multi-picture display device. The disclosure focuses on the picture selector and method of selecting the main picture or subpicture in a picture-in-a-picture system. More particularly, it is directed to a remote controlled mouse for selectively clicking on portions of a television receiver in order to receive a desired picture frame or channel by the click of a mouse.

U.S. Pat. No. 5,524,195 (Clanton, III, et al.) issued Jun. 4, 1996 and is directed to a graphical user interface for interactive television with an animated agent. This is essentially a video-on-demand system which includes a video-on-demand server coupled to a communication medium. A plurality of set top box receivers are coupled to the communication medium for receiving digitized programming in the form of movies and the like from the video-on-demand server. Each set top box includes a CPU which generates and displays a graphic user interface on the subscriber's television. The graphic user interface is used in order to choose the video-on-demand programming or the like from the communication network.

Accordingly, many prior art systems and methods have been developed for generating video-on-demand, or picture within a picture. However, it is desirable and heretofore unknown how to develop a system and method for broadcasting video signals using satellites or microwave technology incorporated with protocol data and providing at the receiving end a set-top box or decoder that is adapted to receive the video information and protocol data and provide a user with a system having the look-and-feel of interactivity. The present invention details the private data which is interleaved within the data stream and provides protocol and synchronization information.

SUMMARY OF THE INVENTION

Generally speaking, in accordance with the instant invention, a system is provided for creating a digital broadcast signal with X-Y protocol data and synch data. The digital broadcast signal can then be broadcast in any manner to be received at remote user locations. User's equipped with set-top boxes can then decode the digital signals. The goal is to provide a large quantity of information, so that a user may navigate through the information provided and obtain a look-and-feel of interactivity.

The system includes an apparatus for receiving broadcast digital signals over a tuneable bandwidth, the broadcast digital signals representing digitally encoded and compressed video, audio or binary data (also generally referred to as event data) and private data or protocol data. Video data as used herein may describe full motion video (with or without audio) or still picture graphics. The apparatus includes a tuner for selecting the tuneable frequency bandwidth and selecting the digital information for video and interactivity in synchronous groups, where each synchronous group has predetermined links defined by link data. The apparatus uses the private data or protocol data to provide a user with the ability to select from indicia of predetermined links and upon such selection, the monitor displays the predetermined link chosen. The apparatus is also equipped to provide the user with the ability to select from the predetermined links, which are displayed on the monitor as the indicia, so that new video as defined by the link may be displayed.

A set-top box or apparatus is located at user locations, such as a user's home or other viewing spot. It is provided for processing broadcast digital signals from tuneable frequency bandwidths. A member is provided for receiving the broadcast digital signal and generating a playable signal including indicia of the protocol data, and the protocol data includes predetermined links to associated playable signals. A member is provided for transmitting the playable signal for display on the display device. A remote control or other input device allows the user to select from the indicia displayed on the display device. The user may then exercise the predetermined link associated with a selected indicia in order to obtain the desired playable signal.

More specifically, the broadcast digital signal includes two components generally referred to as event data and private data. The event data includes but is not limited to audio data, video data and other binary data such as text. The private data includes information often referred to as protocol data. In other words, the private data is akin to a road map which instructs the receiver how to access the event data.

Accordingly, it is an object of the invention to provide a system and method that gives an interactive look-and-feel to a unidirectional digital video broadcast system.

A further object of the invention is to provide synchronous information that is displayable on a monitor and easily accessible by a user, so that a single channel of information received can display multiple programs simply and easily.

Another object of the invention is to provide X-Y protocol data with program data to allow a feeling of interactivity to a user via a remote control, mouse or other similar interface.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts which are adapted to effect such steps, all exemplified in the following detailed disclosure, and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

Figure 1:
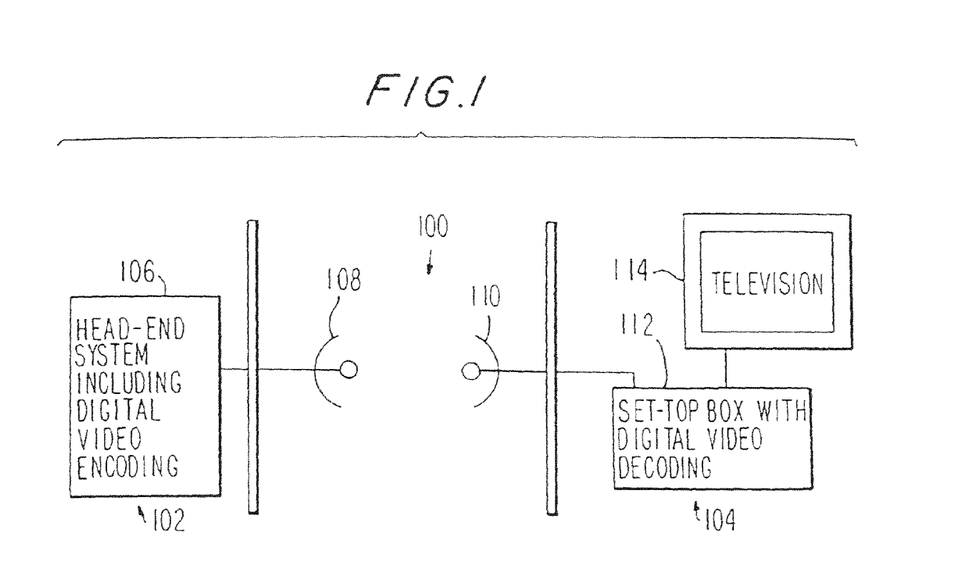
FIG. 1 is a block diagram of a one way digital broadcast system.

Reference is now made to the figures which illustrate the exemplary embodiments of the present invention. With particular reference to FIG. 1, a one way digital broadcast system, generally indicated as 100, constructed in accordance with the instant invention, is depicted. One way digital broadcast system 100 generally includes a head end generally depicted at 102 and a receiving end generally depicted at 104. Head end 102 includes a head end system 106 coupled, in this embodiment, to a microwave transmission dish 108. Receiving end 104 includes a microwave receiving antenna 110 coupled to a set-top box 112 which is in turn coupled to a television monitor 114. The transmission in this embodiment is direct dish-to-dish microwave. An alternative method of direct broadcast can communicate with a satellite which retransmits to the receiving system. Even a wire connection can be used as the digital broadcast medium.

Head end system 106 generally includes system required for digital video transmission and sometimes encoding. The exemplary system is described in more detail in connection with FIGS. 5, 6 and 7. Set-top box 112 generally includes circuitry for digital video decoding and is described in more detail in connection with FIGS. 9 and 10. In operation, a digital video signal is generated at head end system 106 and is transmitted from microwave transmission dish 108. The digital video signal is received by microwave receiving antenna 110 and is converted by set-top box 112 into a usable signal which is then input into television monitor 114 for viewing.

Figure 2:
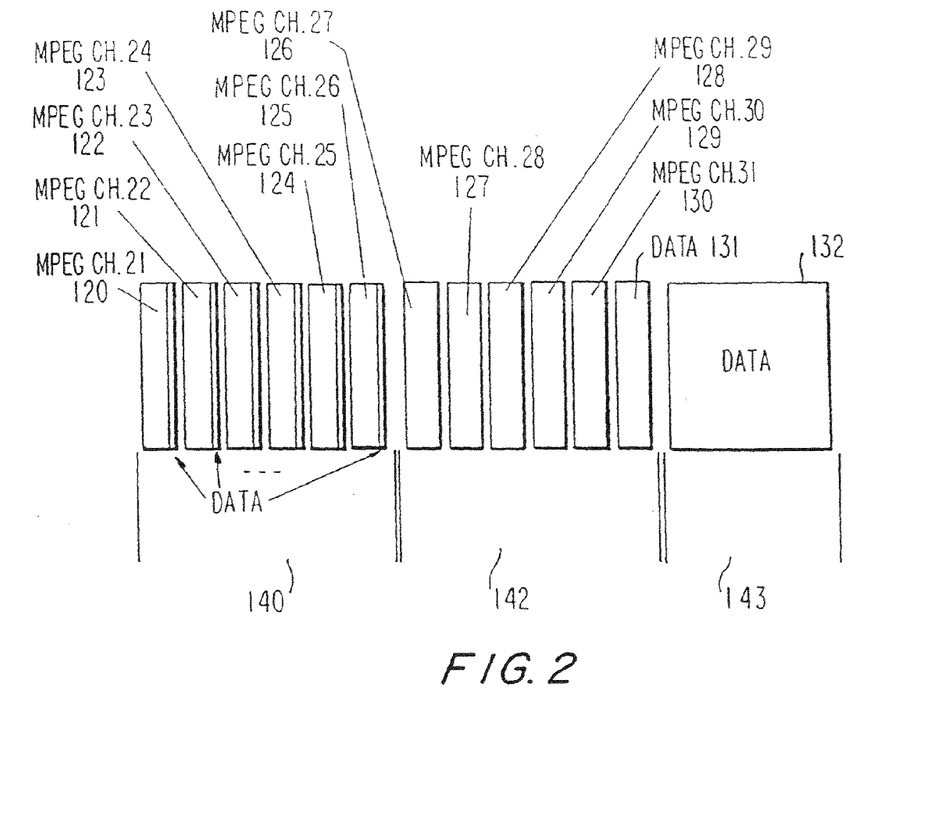
FIG. 2 is a schematic representation of video channels received in tuneable bandwidths.

Reference is next directed to FIG. 2 which illustrates several digital video channels 120-130. In the preferred embodiment of FIG. 2, video channels 120-130 are representative of MPEG channels 21-31, respectively. Digital video channels 120-130 and data channel 131 are transmitted in tuneable bandwidths represented by frequency bands 140 and 142. In this exemplary embodiment, frequency band 140 contains MPEG channels 21-26 (digital video channels 120-125) and frequency band 142 contains MPEG channels 27-31 (digital video channels 126-130). Each of the digital video channels can have data embedded in its stream of data as shown in frequency band 140. Alternatively, a separate data channel 131 can be independent from each of the digital video channels 126-130 but within the same tuneable bandwidth as in frequency band 142. Alternatively, the data can be put on a data dedicated frequency band which receives only data and no digital video channels, such as the situation of data 132 tuneable by frequency band 143.

Frequency band 140, contains digital video channels 120-125 which include both video information and data, such as X-Y protocol data. Frequency band 142 tunes digital video channels 126-130 and data channel 131. Data channel 131 includes a continuous stream of data that is then synchronized to the separate digital video channels 126-130, such that the separate digital video channels 126-130 have the appropriate synchronized X-Y protocol data.

Alternatively, in the situation of frequency band 143, one dedicated frequency band is provided to receive only data bits. Data must be stored in memory and synchronized with video only when tuned to a frequency band that has video.

A preferred use for this system is to provide standard and premium television channels, movies and pay-per-view events through the separate channels. However, it is also possible to provide services other than video from any of the digital data streams 120-132. For example, pages of any kind of text, picture and other multimedia elements could be encoded as hypertext markup language (HTML) data with accompanying files such that world wide web-like pages can be delivered to the television screen. This assumes that the television's visual resolution limitations are contemplated. Of primary importance is that since there is no communication between the set top box at the user site and the head end server, the data must be continuously rebroadcast from the head end server. Accordingly, when the set-top box at the user site needs to access data from any of channels 120-132, there is only a reasonable amount of lag time needed to find the appropriate data.

Figures 3, 4:
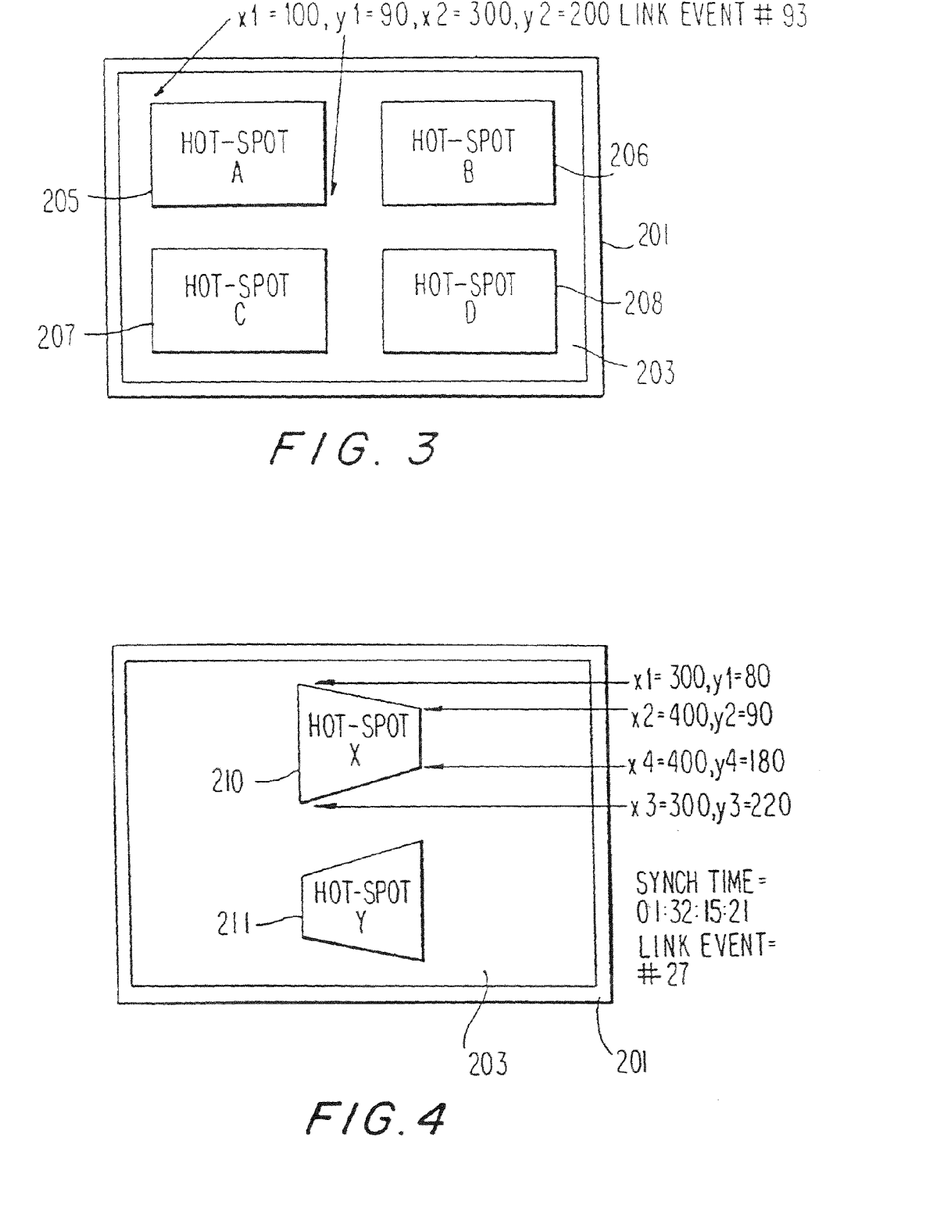
FIG. 3 is a schematic representation of a television screen including plural hot-spots.
FIG. 4 is an alternative embodiment of a video screen including plural hot-spots.

With particular reference to FIG. 3, a typical monitor 201 is illustrated. Monitor 201 includes a screen 203 with four hot-spots 205, 206, 207 and 208 indicated thereon. The hot-spots are predetermined areas on the screen that can be accessed by a remote control, moveable cursor or mouse (not shown). A hot-spot is a dedicated area of the monitor screen. When a hot-spot is accessed it provides a link to a video, audio, graphics or data event, for example, one of the video channels 120-130. The hot-spot is defined by predetermined coordinates. For example, in FIG. 3, the upper left hand corner of hot-spot 205 is defined by coordinates x1=100, y1=90 and the lower right hand corner is defined by coordinates x2=300, y2=220. Using this information, the computer program can draw a rectangle representing the hot-spot and the program can test to see if that hot-spot is active. When the user makes a selection (usually by activating a button on a controller such as an infrared remote control), if the set-top box finds that a hot-spot exists and is currently activated, the program automatically changes the state of the screen being displayed, so that it links to the event indicated by the hot-spot. In the typical situation, this would be a different video sequence. However, it may be other information such as alternate audio, graphics, text or another appropriate program like a game.

In digital television applications the background behind the hot-spots can frequently be video. Since video changes every frame (1/30th of a second in NTSC), an application may have to change the location of the hot-spots and the associated link events every frame. Alternatively, if the hot-spots are relatively stationary, the background may continue to change although the same protocol may exist for the hot-spot for a prolonged period.

In one exemplary embodiment of the screen layout of FIG. 3, each hot-spot might overlay the video of a separate movie. The user would select between the various hot-spots using a remote unit. Upon activation of the remote on the desired selected hot-spot, the system may either provide data (for example in the form of text), or link to the video channel playing the movie.

An alternative X-Y protocol is illustrated for the non-rectangular hot-spot as illustrated in FIG. 4. In FIG. 4, video monitor 201 and screen 203 include hot-spots 210 and 211 which are non-rectangular. In this embodiment, the hot-spot is defined by all four corner positions. In other words, the upper left hand corner of the hot-spot is defined by x1=300, y1=80, the upper right hand corner is defined by x2=400, y2=95, the lower left hand corner is defined x3=300, y3=220 and the lower right hand corner is defined by x4=400, y4=180. Then, the computer program defines the hot-spot by drawing lines between each of the corners. Thus, if the area is selected inside of the hot-spots defined by the four corners, the program will link to whatever the hot-spot is linked to. In the preferred embodiment as defined more particularly in FIGS. 9 and 10, the remote control includes directional buttons for selecting the hot-spot to be highlighted. A second selection button is provided for actually selecting the highlighted hot-spot. When the selection is made, the program changes from multi-screen display to displaying the single selected event. Inherent within this protocol system is the fact that a five- or six-sided polygon can also be mapped out in the same fashion. Additionally, the protocol system illustrated in connection with FIG. 3 is useful for other hot-spots which are not rectangular. By specifying the number of corners of a polygon and the coordinates of those corners, hot-spots which are beyond trapezoids, like pentagons, hexagons and so on can be handled efficiently.

When the screen is changed, and accordingly the hot-spots are changed, the new hot-spot information must be synchronized with the underlying video. This is accomplished by a synchronization time. In fact, anytime the hot-spot information is changed a synch time must be used. The synchronization time is a time corresponding to a specific point in the underlying video where the hot-spots should change. So, providing the time code (for example, SMPTE time code or other) of the frame of the underlying video is a good sync time assuming that the system can determine when the time coded video is played. In the preferred embodiment, the synchronization time is expressed as a time code of the first frame that should use the new interactive data. Time code is not the only way to provide synch data. The synchronization data can also be provided by matching the hot-spot change event with a change in program identification data (PID) or other event in the MPEG stream. Synchronization does not have to happen in every video frame as long as the interactive information does not drift perceptively from the timing dictated by the underlying video.

For example, the corners of the hot-spots could be given a trajectory. All X positions could move one position to the right on every video frame. The computer program can move the rectangle on every vertical blank of the video and thus move the hot-spots without any further synchronization information. Even more complicated trajectory functions can be used, so long as synchronization data is given frequently enough to keep synch.

Another example of synchronization is used when the timing of the hot-spots only needs to be loosely synchronized with the video. In this case, the protocol data is transmitted at approximately the same time as the video data to which it is loosely synchronized. In this method the new protocol data is activated immediately upon reaching the set-up box. This is acceptable because the video will probably be within one second or so of that time.

Figure 5:
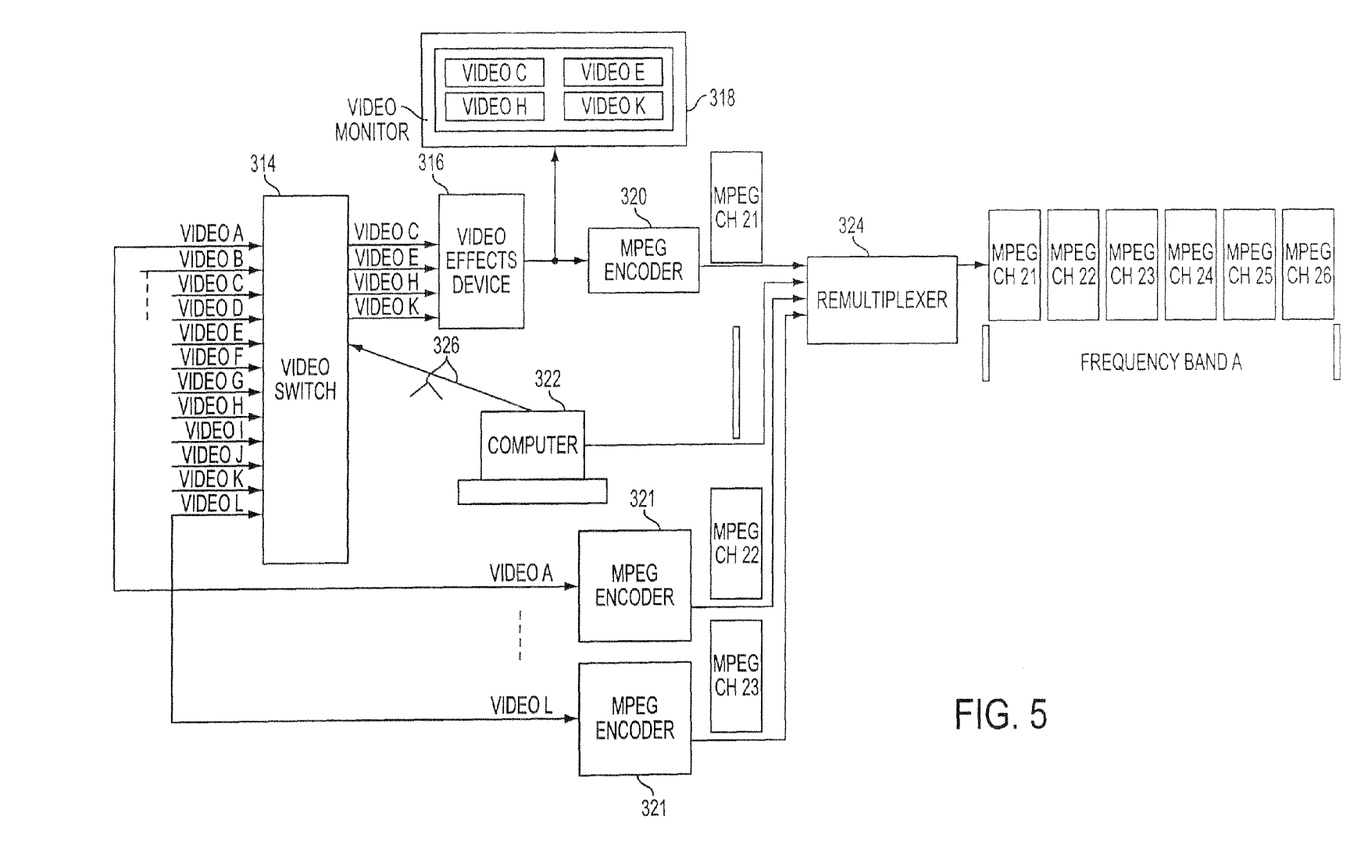
FIG. 5 is a block diagram of a system for encoding video information and data into synchronous information channels capable of broadcast.

Attention is next directed to FIG. 5 which is a block diagram of a preferred embodiment of the system for encoding video information and data into synchronous information channels capable of being broadcast. The system generally receives video signals 301-312 (as used herein video signals 301-312 may each include audio data, video data, and binary data which is also referred to generally as "event data"), which are input into a video switch 314. Video switch 314 selectively outputs chosen video signals of video signals 301-312. As illustrated in the example of FIG. 5, video signals 303, 305, 308, 311 are selectively output from video switch 314. The selected video signals are input into video effects device 316. Video effects device 316 then outputs a multi-screen video signal 317 to video monitor 318 and MPEG encoder 320. An MPEG signal is then output by MPEG encoder 320 to remultiplexer 324. Remultiplexer 324 outputs a signal that is MPEG encoded with interleaved protocol data and synch data.

Computer 322 is electrically coupled to video switch 314 and transmits a signal to switch 314. The signal from computer 322 causes switch 314 to select which video signals 301-312 are output by video switch 314. Computer 322 is also electrically coupled to remultiplexer 324 and transmits information to remultiplexer 324. The information from computer 322 provides remultiplexer 324 with X-Y protocol data and synchronization data for the output MPEG signal. Remultiplexer 324 then outputs an MPEG signal complete with the composite of multiple channels of video information, X-Y protocol data and synchronization data.

Figure 7:
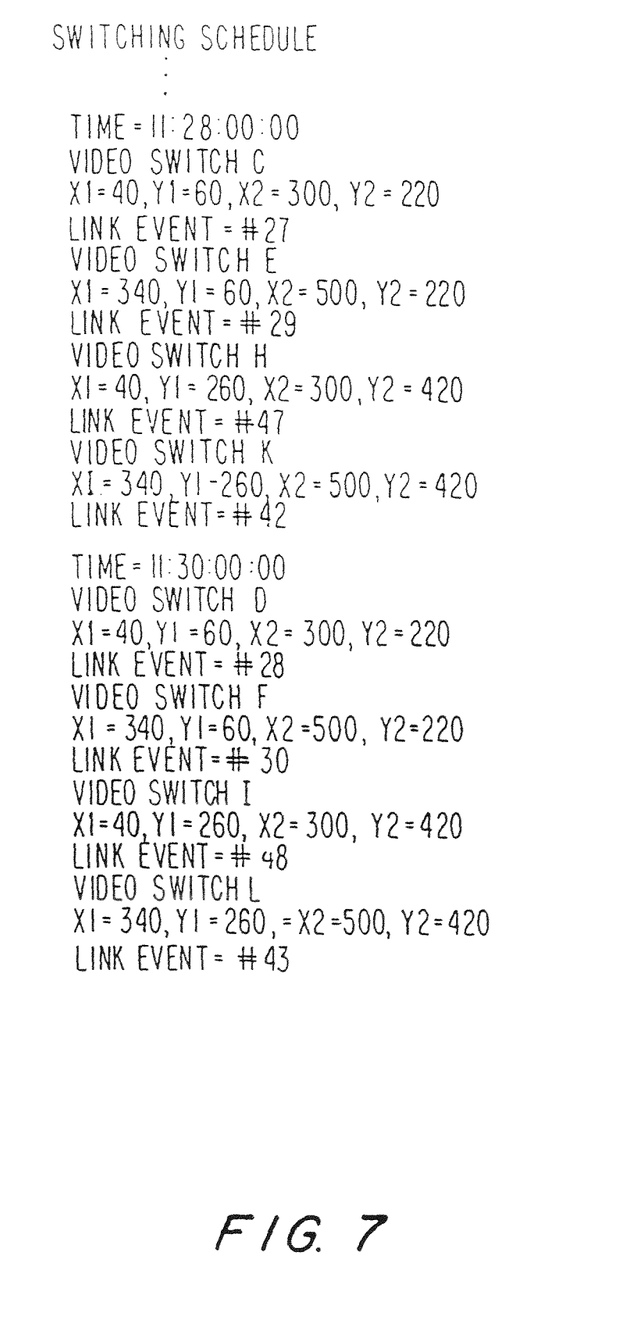
FIG. 7 is an exemplary switch schedule.

In operation, video switch 314 receives a plurality of video signals 301-312. (In an alternative embodiment there may only be one video signal.) The video switch is programmed by computer 322 via control signal 326. Control signal 326 determines which video channels 301-312 are passed through video switch 314. In the present example, video channels 303, 305, 308 and 311 are passed through video switch 314. In practice, the output combination is set for a predetermined period, such as two minutes, as described in the Switching Schedule (FIG. 7). At certain predetermined times, computer 322 changes control signal 326 such that switch 314 outputs different video channels 301-312 to video effect device 316. Video effect device 316 receives four input video signals and modifies the four video images to reduce them in size, so that all four images can be displayed in a single multi-screen video image that can be viewed on video monitor 318. An example of a video effect device is the Picara Q from Active Imaging. Other such video effects devices are also available as common television studio equipment.

Video effect device 316 outputs a multi-screen video image which is received by MPEG encoder 320. MPEG encoder 320 converts the video input into digital video. MPEG encoder 320 then outputs an MPEG encoded signal to remultiplexer 324 which receives the X-Y protocol data and synchronization data for the next set of video images from computer 322. Remultiplexer 324 then interleaves the X-Y protocol data and synchronization data into the digital video data and outputs a stream of data in MPEG format. In other words, the MPEG channel (illustrated as MPEG channel 21) output in FIG. 5 is similar to the MPEG channel of data 120 of FIG. 1.

The system is designed to give a feel of interactivity. Accordingly, the required X-Y protocol data and digital information must be provided on a substantially continuous basis. Thus, when a state change is going to occur by the user accessing a hot-spot with the interface, the system must in effect, anticipate such a change and provide information for the anticipated change. As an example, the X-Y protocol data describes the information for the switch in video source at switch 314 that is going to occur in the following time period. Examples of equipment for the devices in FIG. 5 are: Philips Venus Routing Switcher with Jupiter Control System-Switch; Picara Q by Active Imaging-Video Effects Device; and Divicom MV20 and MN20-Encoder/Remultiplexer.

Figure 9:
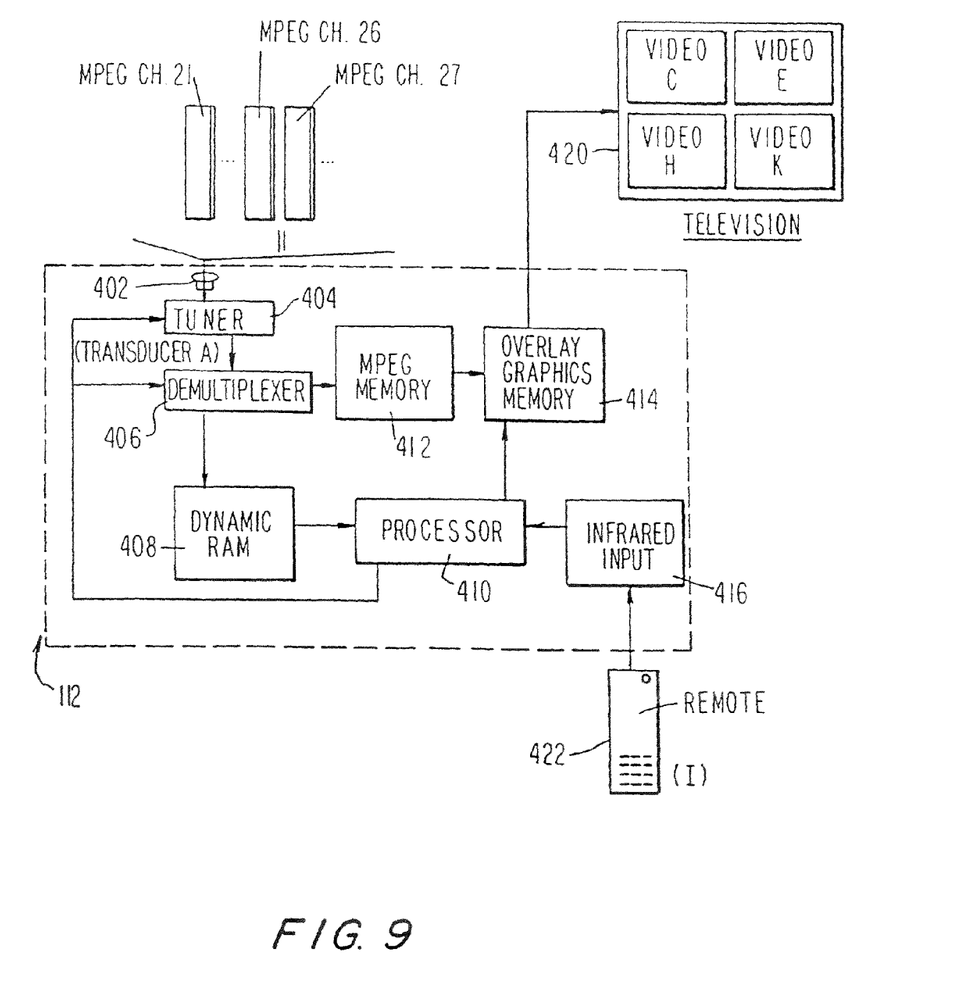
FIG. 9 is a block diagram of hardware for a set-top box for decoding X-Y protocol.
Figure 10:
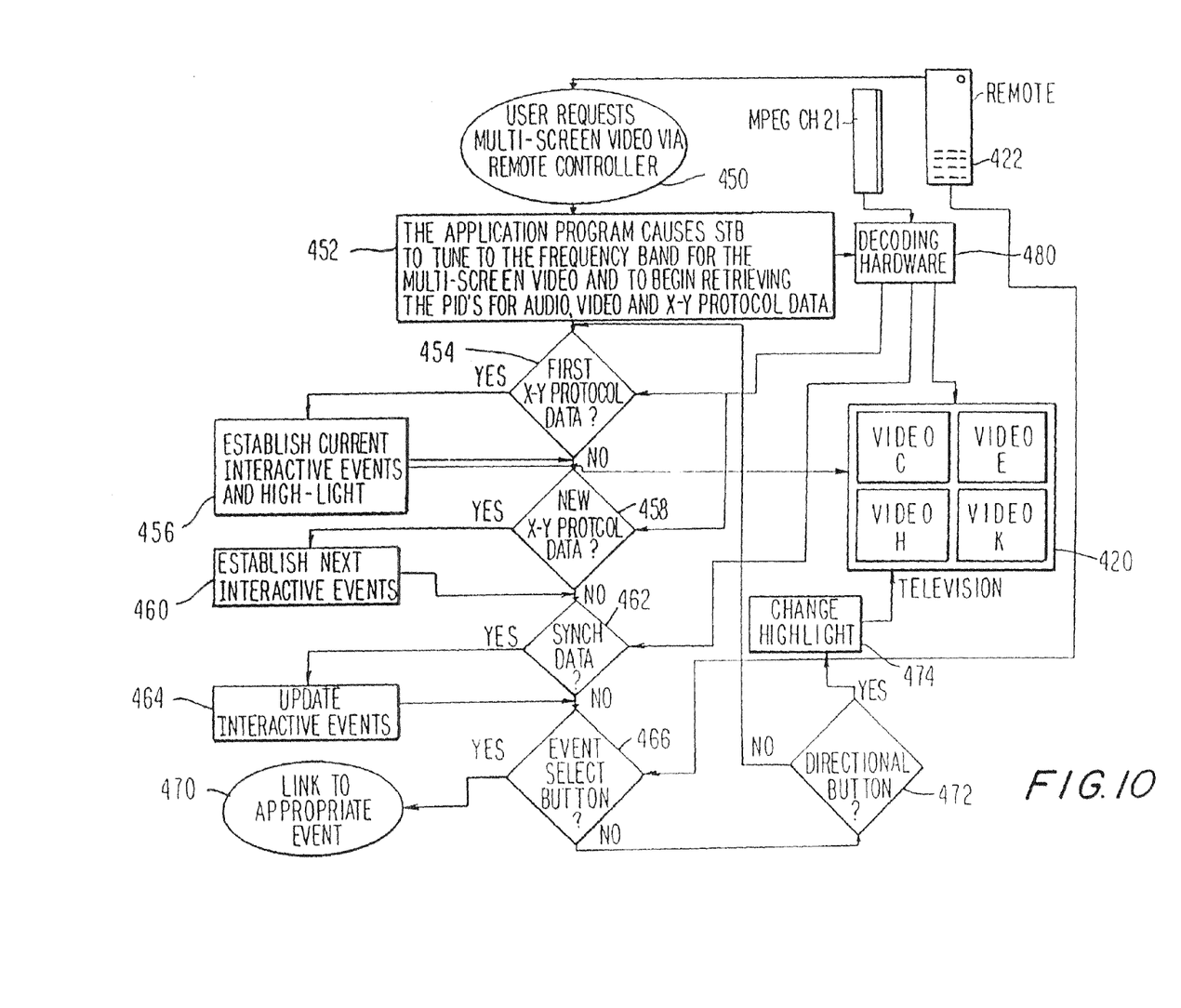
FIG. 10 is a logic flow diagram for the set-top box in accordance with the present invention.

The first stream of information travels in a path from video switch 314 to video effects device 316 to MPEG encoder 320 and out remultiplexer 324. This information path creates a multiscreen display (four or more pictures on one screen). Additionally, video channels 301-312 can be input straight into MPEG encoders 321. The MPEG encoded signals from MPEG encoders 321 are then input into remultiplexer 324 and are interleaved with X-Y protocol data and synch data. Thus, the remultiplexer outputs a plurality of MPEG channels with X-Y protocol data and synchronization data interleaved therein that are tuneable to a single frequency band. In this exemplary embodiment, MPEG channels 21-26 are all tuneable to one frequency band. The set top box described in connection with FIGS. 9 and 10 is responsible for decoding this information.

Figure 6:
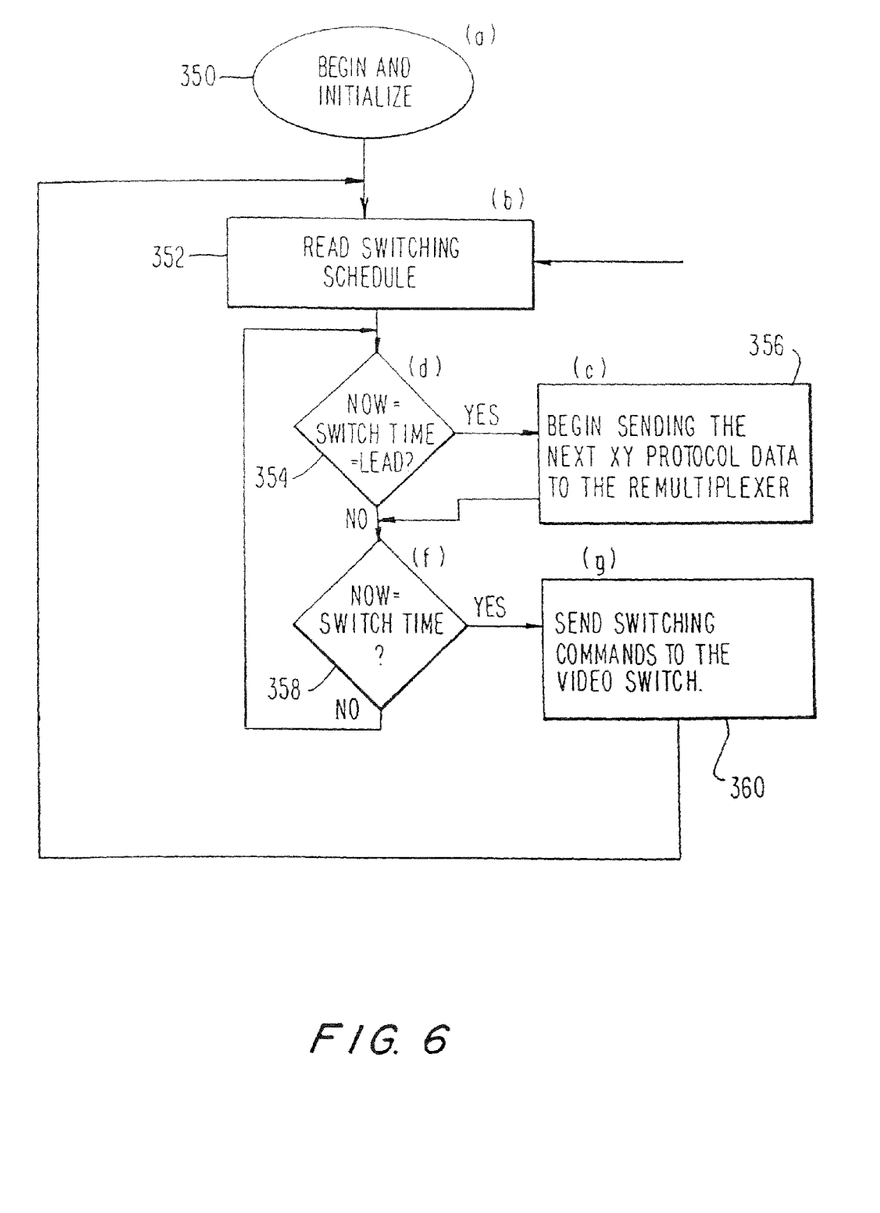
FIG. 6 is a flow chart illustrating the flow of logic in the head end.

Particular reference is next directed to FIG. 6 which is a flowchart illustrating the computer control process for switching video and transmitting X-Y protocol data. The process begins at block 350, with the initialization of the process. The process then moves to block 352 and accesses the switching schedule and reads the switching schedule. The switching schedule is illustrated and discussed in more detail in connection with FIG. 7. Next, the process moves to logic block 354 and asks whether the present time equals the switch time minus a predetermined lead time. If the answer is "yes," present time equals switch time minus the predetermined lead, the process moves to block 356 and begins sending the next X-Y protocol data to the remultiplexer, which is illustrated as remultiplexer 324 of FIG. 5. After completing logic block 356, or if the answer in logic block 354 is "no," the process moves to logic block 358 and asks whether present time is switch time. If the answer is "no," present time is not switch time, the process loops back to logic block 354. Alternatively, if the answer is "yes" in logic block 358, present time is switch time, the process moves to logic block 360 and sends the switching commands to the video switch. The process then returns to logic block 352 and repeats the process indefinitely.

Particular attention is next directed to FIG. 7 which illustrates exemplary data for the switching schedule. The switching schedule is a continuous schedule that can be on any time basis in the embodiment illustrated in FIG. 7, two iterations of the switching schedule are provided: one at time=11:28:00:00 and the second at time 11:30:00:00. At time 11:28:00:00 video switch C is indicated by the hot-spot located at x1=40, y1=60, x2=300, y2=220 and is associated with link event 27. Video switch E is associated with the hot-spot located at x1=340, y1=60, x2=500, y2=220 and link event 29. Video switch H is associated with hot-spot x1=40, y1=260, x2=300, y2=420 and link event 47. Video switch K is associated with hot-spot x1=340, y1=260, x2=500, y2=420 and link event 42.

Figure 8:
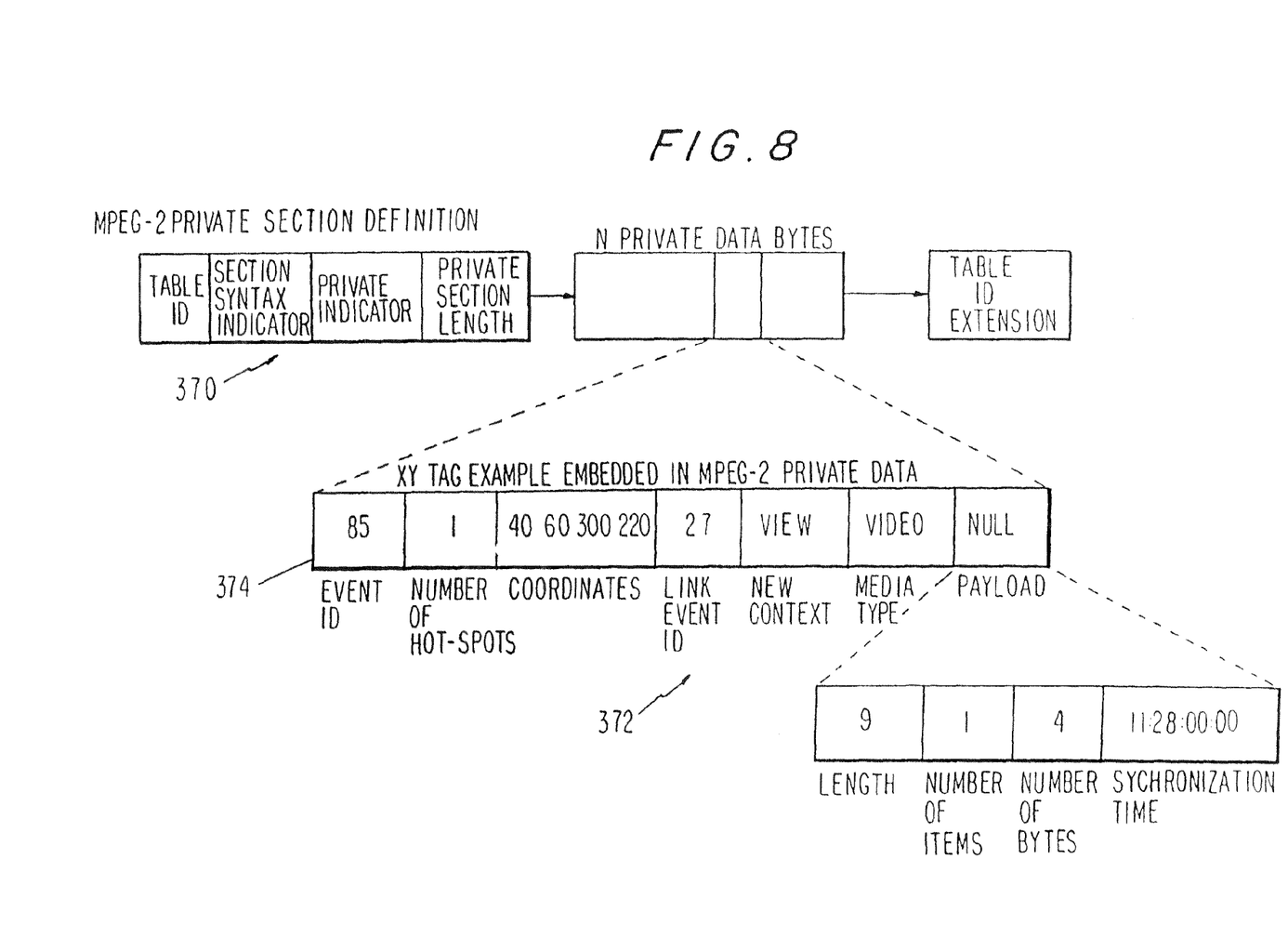
FIG. 8 is an exemplary MPEG2 transport stream with X-Y protocol data and synchronization data illustrated.

Particular attention is now directed to FIG. 8 which illustrates how the X-Y protocol data is embedded in an MPEG2 transport stream, which is generally indicated at 370. MPEG2 is the present industry standard for transmission of video signals. As described above, in a system operating under the present invention many data streams containing audio, video and data are transmitted. The data is transmitted in the N private data bytes. Part of the N private data bytes are dedicated to one of the X-Y protocol data segments for the first of the hot-spots described in the switching schedule (FIG. 7). The X-Y protocol is a tagging mechanism which associates a tag with a viewing event. The X-Y protocol tag is generally indicated at 372. The X-Y protocol tag has a unique event identification (event id 374) and a set of hot spots.

In the exemplary embodiment of FIG. 8, the event id is 85. There is one hot-spot and it is located at coordinates (40 60 300 220). In other words the hot-spot is located at x1=40, y1=60, x2=300, y2=220. This hot-spot links to link event 27. The new context is "view" and the media type of the new event is video. The "new context" and "media type" fields are examples of other types of data that can be included in the data stream. The payload field provides the synchronization information. The payload data is further broken out such that the length is 9. There is 1 item which contains 4 bytes, and it is located a synchronization time 11:28:00:00.

Particular attention is now directed to FIG. 9 which is a block diagram representing sample hardware required for decoding the X-Y protocol. In particular, the set-top box is generally indicated as 112. Set-top box 112 generally includes input connector 402 electrically coupled to tuner 404. Tuner 404 is connected to demultiplexer 406 and processor 410. Demultiplexer 406 is additionally connected to processor 410, dynamic RAM 408 and MPEG memory 412. Dynamic RAM 408 is additionally connected to processor 410. Processor 410 is electrically connected to infrared input 416 and overlay graphic memory 414. Overlay graphic memory 414 is connected to MPEG memory 412 as well as television 420 which is outside of set-top box 112. An infrared remote unit 422 is required to access infrared input 416 to request interactivity.

Set-top box 112 receives a signal from an antenna, such as microwave receiving antenna 110 of FIG. 1, and the signal is input through input connector 402 at the back of set-top box 112. Tuner 404 receives the complete signal including all the various decodable channels from all of the various frequency bands 140, 142, 143, etc. as illustrated in FIG. 2. Tuner 404 is responsible for tuning in the appropriate frequency band for the requested video signal. The appropriate MPEG channel received is then demultiplexed by demultiplexer 406. In other words, the video information and other data such as audio and X-Y protocol data are separated. The MPEG data is then fed to MPEG memory 412 where it is turned into audio and video information, and the X-Y protocol data is transmitted to dynamic RAM 408 where it is accessible by processor 410.

Processor 410 creates transparent overlays for the video by drawing polygons in overlay graphics memory 414 which can be seen as a highlight over the video on television monitor 420. User input from remote unit 422 is detected by the set-top box's infrared input circuitry 416 and passed on to processor 410 which can change the location and shape of the polygon. Also, when the user activates the select button on remote 422, processor 410 can cause the tuner 404 and demultiplexer 406 to change the channel or provide some other event stored in dynamic RAM 408.

Particular attention is next directed to FIG. 10 which is a data flow diagram illustrating the processes of decoding the received signal and the appropriate protocol for the multi-screen video mode of operation. The process is initiated at logic block 450 where the user requests multi-screen video via remote control 422. The process then moves to block 452 where the application program causes the set-top box to tune to the frequency band for the multi-screen video and to begin retrieving data packets with program identifications for audio, video and X-Y protocol data for the multi-screen video channel. The process then moves to logic block 454 and asks whether the data accessed in block 452 is the first X-Y protocol data. If the answer "yes," the data is the first X-Y protocol data, then the process moves to block 456 and establishes the current interactive events and highlights the default interactive event.

After completion of block 456, or if a "no" response is determined in logic block 454 (this is not the first X-Y data), the process moves to logic block 458. In logic block 458, the process asks whether there is new X-Y protocol data. If a "yes" response is determined indicating there is new X-Y protocol data, the process moves to block 460 and establishes the next interactive event. If a "no" response is received in logic block 458, or after completion of step 460, the process moves to block 462 and asks whether the data received is synchronization data. If a "yes" response is determined in logic block 462 indicating that synchronization data has been received, the process moves to block 464 and updates the interactive event. Alternatively, if a "no" response is determined in block 462, or after completion of block 464, the process moves to logic block 466. In logic block 466, the process asks whether the event select button was pressed on the remote. If a "yes" response is determined, indicating the event select button was pressed on the remote, the process moves to block 470 and changes the channel to link the appropriate signal to television monitor 420 so that the appropriate event is displayed or otherwise uses data in the memory or in transmission to present the appropriate event.

If the event select button is not pressed on the remote, a "no" response is determined in block 466 and the process moves to block 472 and asks whether a directional button was activated. If a directional button was activated, a "yes" response in block 472 is determined, and the process moves to block 474 to change the highlighted event. The highlight on television monitor 420 is then appropriately adjusted. Alternatively, if a "no" response is determined in block 472 indicating that no directional button was activated, the process loops back to logic block 454.

In the illustrative example of FIG. 10, MPEG channel 21 is input into decoding hardware 480. The decoding hardware then outputs the X-Y protocol information to logic blocks 454 and 458. This information is used to determine which X-Y protocol information is being accessed. Additionally, decoding hardware 480 outputs synchronization data to logic block 462. Audio and video information are output from decoding hardware 480 to monitor 420.

FIG. 10 illustrates the process of decoding the information (audio, video, synchronization data and X-Y protocol data) received at the set-top box. The process begins when the user presses a button on the remote control 422 and enters the multi-screen video mode of operation (block 450) for the system. The computer program's logic begins by initialization in block 452 which includes setting the set-top box hardware to tune to the frequency band which has the multi-screen MPEG channel and starts decoding the data packers with program identifications for audio and video, X-Y protocol data and synchronization data.

Once the decoding begins, audio and video information are converted to a composite television signal and passed to a television set (monitor 420). The computer program searches primarily for the first X-Y protocol data (logic block 454). When the first X-Y protocol data is detected, the data is set in memory as the current X-Y data and a highlight is drawn on television monitor 420 over the first hot-spot. Subsequent logic in the event loop, checks for new, different X-Y data to arrive (logic block 458). When new data arrives it is held in the "next X-Y data" memory location (not shown) until synchronization data is detected (logic block 462). When the synchronization data is detected, the current data is updated to the new data.

The event loop also detects the state of the remote control button pushing. If the "select" button is detected (block 466), the program will link to the proper event (block 470) and display that event and terminate the multi-screen video logic. Alternatively, if a direction button is pushed (block 472), the highlight is redrawn around the appropriate hot-spot.

Accordingly, general review of FIG. 10 illustrates one simple continuous loop for multi-screen video viewing. The loop detects additional X-Y protocol data, stores the data, and detects synchronization data. The loop also detects transmissions from the remote control that cause the status of the multi-screen video to change, such as selecting one of the events on the multi-event screen, or changing the event on the multi-event screen that is highlighted. In this way, the appearance of interactivity is experienced by a user with unidirectional data transfer. No data is transferred from the set-top box to the head end.

The present invention is thus directed to a system and method for providing a user with an interactive look-and-feel in a digital broadcast. Users sitting at remote locations such as their homes would, for example, watch television and a set-top box would be provided for decoding the digital broadcast signal received. The invention allows a user to watch television in various different modes. For example, in one mode the television would display a plurality of separate videos (each video enclosed in a hot-spot) and a user could select any of the plurality of videos on the screen for display on a full screen. In essence, the user would enter a command on a remote control and one of the multiple screens would be displayed in full. A different example would include a program schedule on the screen, where each line of program information includes X-Y protocol data, such that each line is a hot-spot. When the user executes on a hot-spot he/she would receive either text (binary data) regarding the program, or in the alternative, would be connected to the actual program (video and audio). Thus, the system provides the appearance of interactivity.

It will thus be seen that the objects set forth above, among those made apparent from the preceding descriptions, are efficiently attained and, since certain changes may be made in the carrying out of the above process, in the described product, and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which, as a matter of language, might be said to fall therebetween.

What is claimed is:

1. A method comprising:
generating private data including an indication of a number of hot-spots on a screen and link data;
linking a first hot-spot to a first of a plurality of playable video signals by at least a first portion of the link data, the link data including a first display location of the first hot-spot on the screen;
linking a second hot-spot to a second of the plurality of playable video signals by at least a second portion of the link data, the link data including a second display location of the second hot-spot on the screen;
processing the private data and the plurality of playable video signals to generate a digital signal, wherein the digital signal includes the private data and the plurality of playable video signals;
transmitting a first portion of the digital signal during a first time interval, wherein the first portion of the digital signal is associated with the first of the plurality of playable video signals;
transmitting a second portion of the digital signal during a second time interval, the second portion being a different portion from the first portion, the second time interval being a different time interval from the first time interval, wherein the second portion of the digital signal is associated with the second of the plurality of playable video signals; and
transmitting the digital signal, including the indication of the number of hot-spots and the link data, from a server during the first time interval and the second time interval.

2. The method of claim 1, wherein the server is a head end server.

3. The method of claim 1, wherein the digital signal includes audio data, video data, binary data, or combinations thereof.

4. The method of claim 3, wherein the digital signal includes interleaved bits of at least one of the audio or video data and the binary data.

5. The method of claim 1, wherein each of the first and second display locations are defined by a set of coordinates.

6. The method of claim 1, wherein the first portion and the second portion of the digital signal are transmitted from the server.

7. The method of claim 1, wherein the link data further includes a synchronization time indicating temporal position of the plurality of playable video signals.

8. A method comprising:
receiving a digital signal from a server during a first time interval and a second time interval, the digital signal being based on private data and a plurality of playable video signals, the private data including an indication of a number of hot-spots on a screen and link data, a first hot-spot being linked to a first of a plurality of playable video signals by at least a first portion of the link data, the link data including a first display location of the first hot-spot on the screen, a second hot-spot being linked to a second of the plurality of playable video signals by at least a second portion of the link data, the link data including a second display location of the second hot-spot on the screen;
receiving a first portion of the digital signal during the first time interval, wherein the first portion of the digital signal is associated with the first of the plurality of playable video signals;
receiving a second portion of the digital signal during the second time interval, the second portion being a different portion from the first portion, the second time interval being a different time interval from the first time interval, wherein the second portion of the digital signal is associated with the second of the plurality of playable video signals;
generating a first display location of the first portion of the digital signal and a second display location of the second portion of the digital signal based on the link data;
highlighting, by a processor and a graphics memory, at least one of the first or second hot-spots with a polygonal highlight;
causing the screen to simultaneously display the first portion of the digital signal associated with the first of the plurality of playable video signals in the first display location, and the second portion of the digital signal associated with the second of the plurality of playable video signals in the second location;
activating, by the processor, one of the first or second hot-spots having the polygonal highlight as a selected hot-spot associated with one of the first of the plurality of playable video signals or the second of the plurality of playable video signals; and
causing display of a playable video signal associated with the selected hot-spot on a full screen.

9. The method of claim 8, wherein the link data further includes a synchronization time indicating temporal position of the plurality of playable video signals.

10. The method of claim 9, wherein the first of the plurality of playable video signals is generated in synchronization with the second of the plurality of playable video signals based on the synchronization time.

11. The method of claim 8, wherein the digital signal includes audio data, video data, binary data, or combinations thereof, and the method further comprises:
receiving, by an infrared input, a directional request from a remote unit;
moving, by the processor, the polygonal highlight from one of the first or second hot-spots to another of the first or second hot-spots in response to the directional request; and
changing, by the processor, a shape of the polygonal highlight in response to the directional request.

12. The method of claim 11, wherein the digital signal includes interleaved bits of at least one of the audio or video data and the binary data.

13. The method of claim 8, wherein each of the first and second display locations is defined by a set of coordinates.

14. A non-transitory machine-readable medium comprising instructions executable by one or more processors, the instructions comprising:
instructions to generate private data including an indication of a number of hot-spots on a screen and link data;
instructions to link a first hot-spot to a first of a plurality of playable video signals by at least a first portion of the link data, the link data including a first display location of the first hot-spot on the screen;
instructions to link a second hot-spot to a second of the plurality of playable video signals by at least a second portion of the link data, the link data including a second display location of the second hot-spot on the screen;
instructions to process the private data and the plurality of playable video signals to generate a digital signal, wherein the digital signal includes the private data and the plurality of playable video signals;
instructions to transmit a first portion of the digital signal during a first time interval, wherein the first portion of the digital signal is associated with the first of the plurality of playable video signals;

instructions to transmit a second portion of the digital signal during a second time interval, the second portion being a different portion from the first portion, the second time interval being a different time interval from the first time interval, wherein the second portion of the digital signal is associated with the second of the plurality of playable video signals; and instructions to transmit the digital signal, including the indication of the number of hot-spots and the link data, from a server during the first time interval and the second time interval.

15. A non-transitory machine-readable medium comprising instructions executable by one or more processors, the instructions comprising:

instructions to receive a digital signal from a server during a first time interval and a second time interval, the digital signal being based on private data and a plurality of playable video signals, the private data including an indication of a number of hot-spots on a screen and link data, a first hot-spot being linked to a first of a plurality of playable video signals by at least a first portion of the link data, the link data including a first display location of the first hot-spot on the screen, a second hot-spot being linked to a second of the plurality of playable video signals by at least a second portion of the link data, the link data including a second display location of the second hot-spot on the screen;

instructions to receive a first portion of the digital signal during the first time interval, wherein the first portion of the digital signal is associated with the first of the plurality of playable video signals;

instructions to receive a second portion of the digital signal during the second time interval, the second portion being a different portion from the first portion, the second time interval being a different time interval from the first time interval, wherein the second portion of the digital signal is associated with the second of the plurality of playable video signals;

instructions to generate a first display location of the first portion of the digital signal and a second display location of the second portion of the digital signal based on the link data;

instructions to highlight, by a processor and a graphics memory, at least one of the first or second hot-spots with a polygonal highlight instructions to simultaneously display, on the screen, the first portion of the digital signal associated with the first of the plurality of playable video signals in the first display location, and the second portion of the digital signal associated with the second of the plurality of playable video signals in the second location;

instructions to activate, by the processor, one of the first or second hot-spots having the polygonal highlight as a selected hot-spot associated with one of the first of the plurality of playable video signals or the second of the plurality of playable video signals; and instructions to display a playable video signal associated with the selected hot-spot on a full screen.

16. A system for transmitting multi-screen video images, the system comprising:

a video switch configured to receive a plurality of video signals and to output first chosen video signals from among the plurality of video signals;

a video effects device configured to receive the first chosen video signals and to output a multi-screen video signal;

a first video encoder configured to receive the multi-screen video signal and to output an encoded video signal including the multi-screen video signal;

a second video encoder configured to receive at least one second chosen video signal from among the plurality of video signals, to encode the at least one second chosen video signal, and to output the encoded at least one second chosen video signal;

a processor configured to generate protocol data associated with the multi-screen video signal, wherein the protocol data includes an indication of a number of hot-spots on a screen and link data;

a remultiplexer configured to receive the encoded video signal including the multi-screen video signal, the protocol data, and the encoded at least one second chosen video signal, and to produce a composite signal; and a transmitter configured to transmit the composite signal including the number of hot-spots and the link data.

17. A method for processing a plurality of videos, the method comprising:

tuning to a frequency band associated with multi-screen video;

retrieving data including at least video data and private data for a plurality of videos associated with the multi-screen video, wherein the private data includes X-Y protocol data and an indication of a number of hot-spots on a television screen;

causing display of each of the plurality of videos on a same television screen;

enclosing each of the plurality of videos in a corresponding hot-spot from among the hot-spots based at least in part on the X-Y protocol data;

highlighting, by a processor and a graphics memory, one of the plurality of videos with an overlaying polygonal highlight;

moving the overlaying polygonal highlight to another one of the plurality of videos in response to a directional request; and causing, in response to a select request, display of the another one of the plurality of videos with the highlight in a full screen on the same television screen.

18. The method of claim 17, wherein displaying each of the plurality of videos includes simultaneously displaying each of the plurality of videos on the same television screen.

19. The method of claim 17, wherein a plurality of screen locations are defined at least in part by the X-Y protocol data, and wherein the plurality of screen locations include the corresponding screen location, the method further comprising:

activating, by the processor, one of the plurality of screen locations associated with a first of the plurality of videos; and causing display of the first of the plurality of videos in the full screen on the same television screen.

20. The method of claim 19, further comprising:

changing, by the processor, a shape of the polygonal highlight in response to the directional request;

activating, by the processor, another of the plurality of screen locations associated with a second of the plurality of videos; and causing display of the second of the plurality of videos in the full screen on the same television screen.

* * * * *